June 25, 1935.    J. A. SPENCER    2,006,152
FLOW CONTROL
Filed July 31, 1933    6 Sheets-Sheet 1

John A. Spencer, Inventor,
Delos F. Haynes, Attorney.

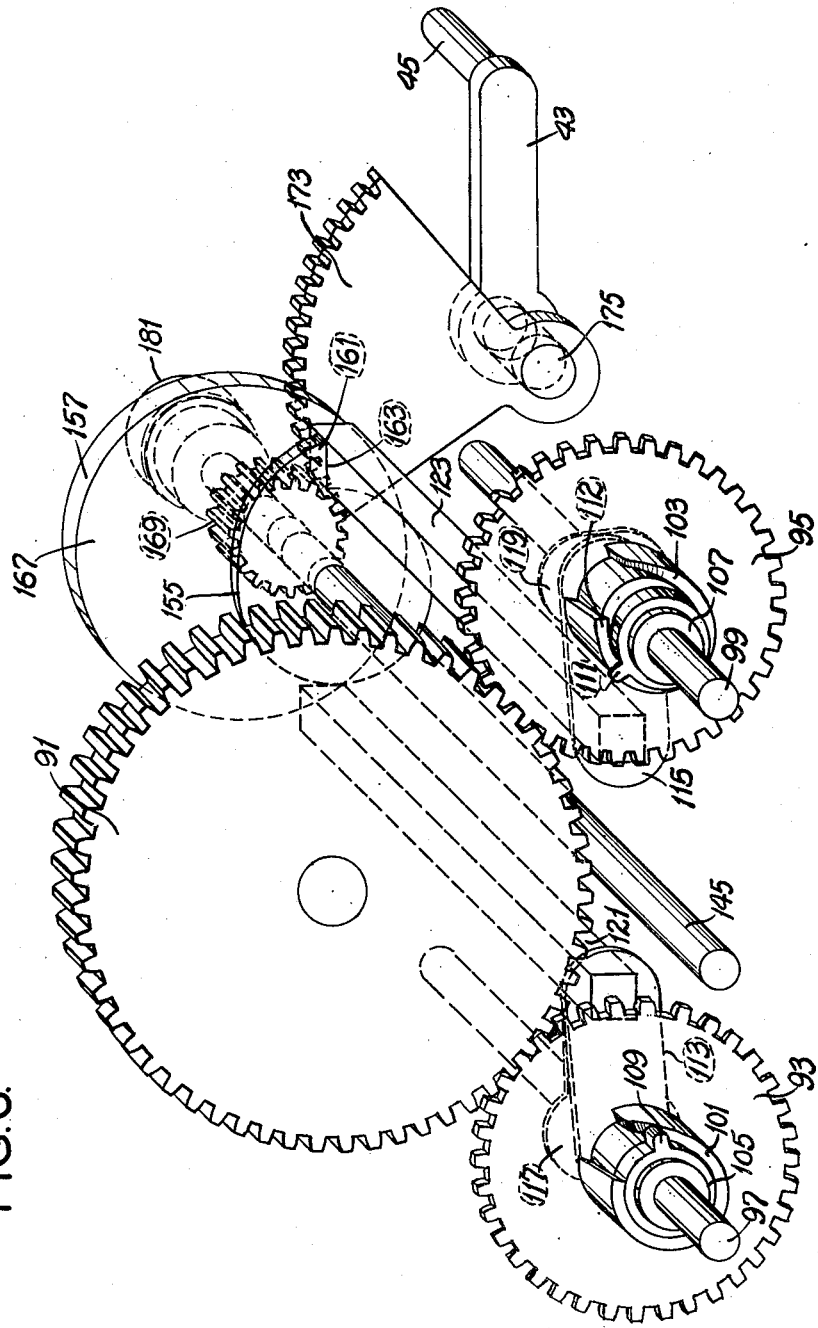

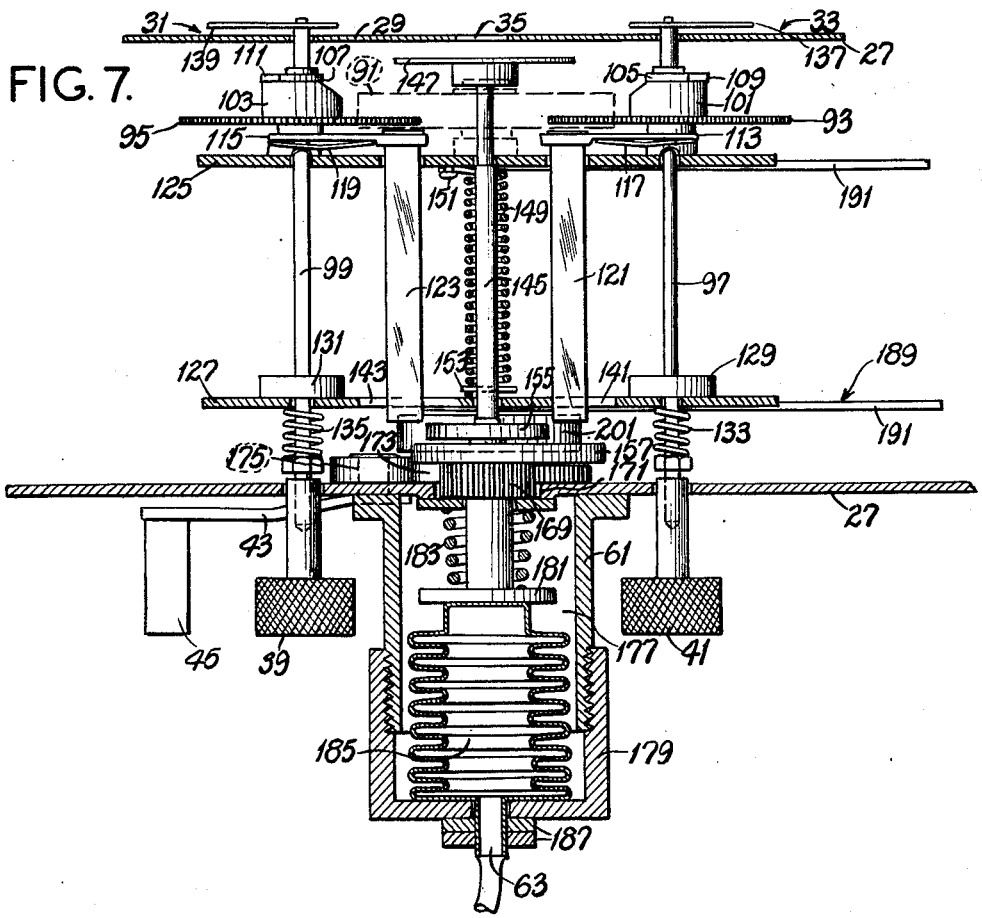

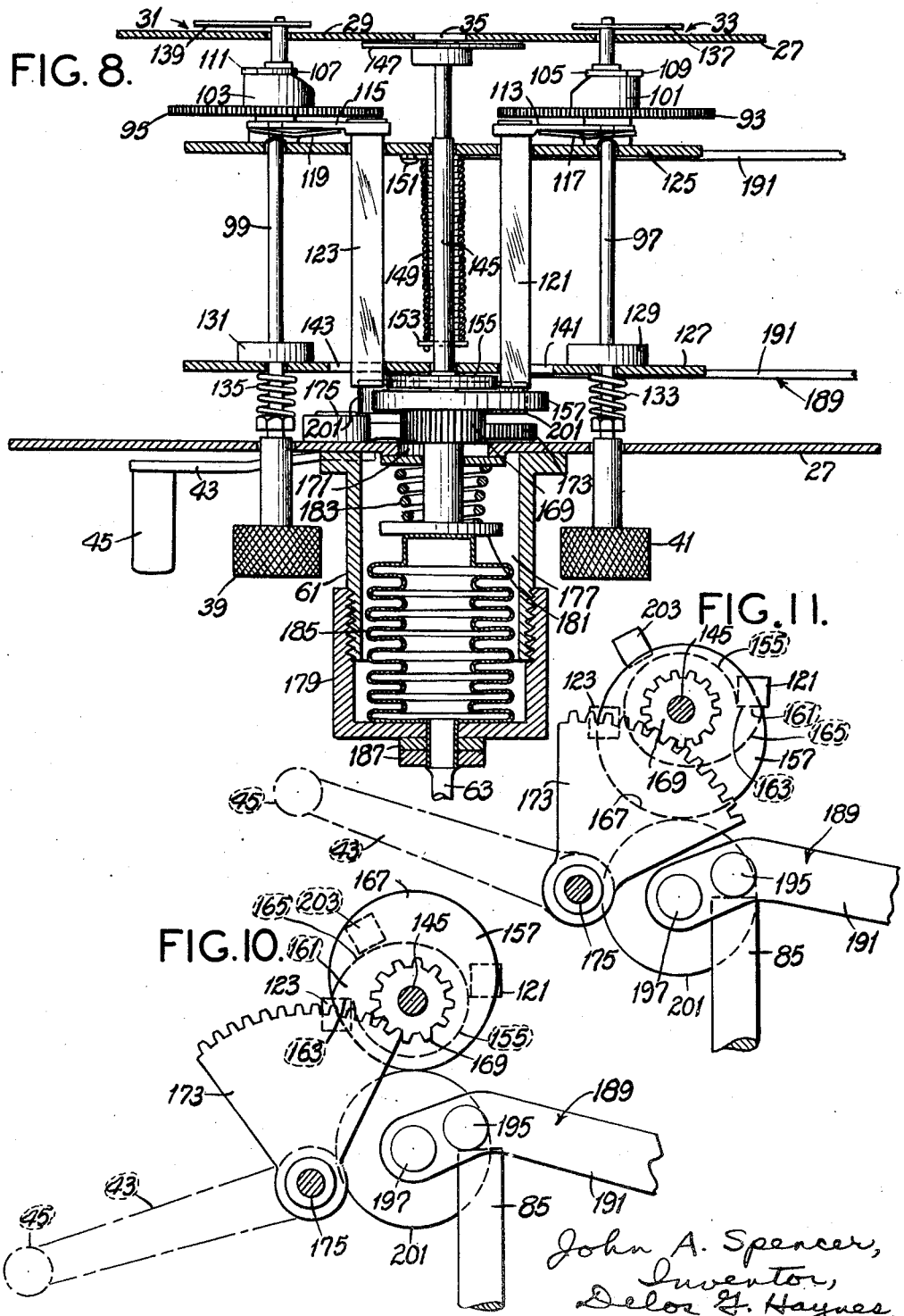

Patented June 25, 1935

2,006,152

UNITED STATES PATENT OFFICE 2,006,152

FLOW CONTROL

John A. Spencer, Newtonville, Mass., assignor to General Plate Company, Attleboro, Mass., a corporation of Massachusetts Application July 31, 1933, Serial No. 682,953

10 Claims. (Cl. 161—9)

This invention relates to fluid flow controls, and with regard to certain more specific features, to means for controlling the flow of fluid with regard to both time and temperature conditions.

Among the several objects of the invention may be noted the provision of control means of the class described which, when installed in a gas range, for example, is conditionable to permit the commencement of gas flow to the burners at a determined time in the future, and to discontinue such flow at another determined time thereafter, the flow at such future time being further conditioned by a pilot burner, whereby, if the burner is ignited, gas flow is permitted in the designated time interval, but if the burner is not ignited, gas flow is not permitted until such pilot burner is reignited; the provision of a time-controlled gas valve which includes means rendering the valve inoperative to open when an outside temperature condition is not complied with; the provision of a control means for gas ranges or stoves which performs the joint functions of a clock valve and a safety pilot; the provision of a control means of the class described which automatically signals the user when the pilot burner is in such condition that no gas flow will be permitted; and the provision of control means of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is an isometric view of a gas range embodying control means in accordance with the present invention;

Fig. 6 is a diagrammatic isometric view of certain control elements;

Fig. 7 is a horizontal cross section taken on lines 7—7 of Figures 3 and 4;

Fig. 8 is a horizontal cross section similar to Fig. 7, but illustrating certain parts in their alternate operating positions; and, Figures 9, 10, and 11 are diagrammatic views illustrating successive operating positions of certain elements of the control means.

Similar reference characters indicate corresponding parts throughout the several views of the drawings.

Gas ranges and similar devices have for some time past been equipped with clock or time controls, whereby the user may set the control to turn on the flow of gas at a predetermined time in the future, and thereafter at a second predetermined time cut off the flow of the gas. The utility of such an arrangement is obvious.

It has also been the custom for some time past to provide gas ranges and the like with a thermostatic safety pilot, such device functioning when the main pilot burner of the stove has been extinguished, to prevent the flow of gas to any of the burners. This arrangement is conducive to safety in operation, as it prevents the escape of gas from burners which are unignited due to the fact that the pilot burner is not in condition to ignite such burner.

In the present invention, the control means performs the joint function of the clock or time control and the safety pilot.

Figure 1:
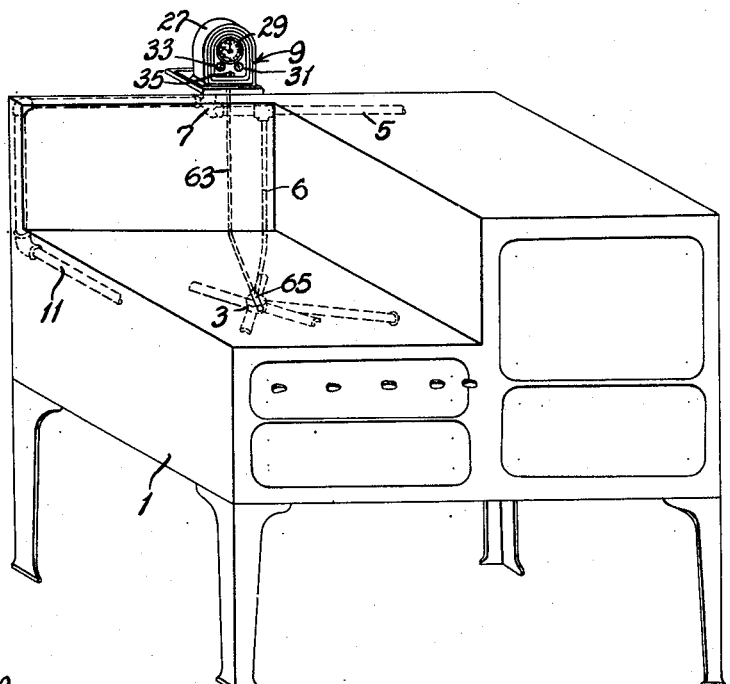

Referring to Fig. 1, numeral 1 indicates a gas range which is provided with a main pilot burner 3, it being presumed that the main pilot burner 3 is arranged for constant burning. A supply pipe 5 leads gas to the range, a branch pipe 6 leading therefrom to the pilot burner 3. A valve 7, which forms part of a control means 9, controls the flow of gas from the supply pipe 5 through a range main 11 to the various burners of the stove. The control means 9 comprises the present invention in particular. In the arrangement shown in Fig. 1, said control means 9 operates in such manner that flow of gas into the main 11 is permitted only if the pilot burner 3 is ignited, and only at such a time and for such a duration of time as is desired by the operator.

Figure 2:
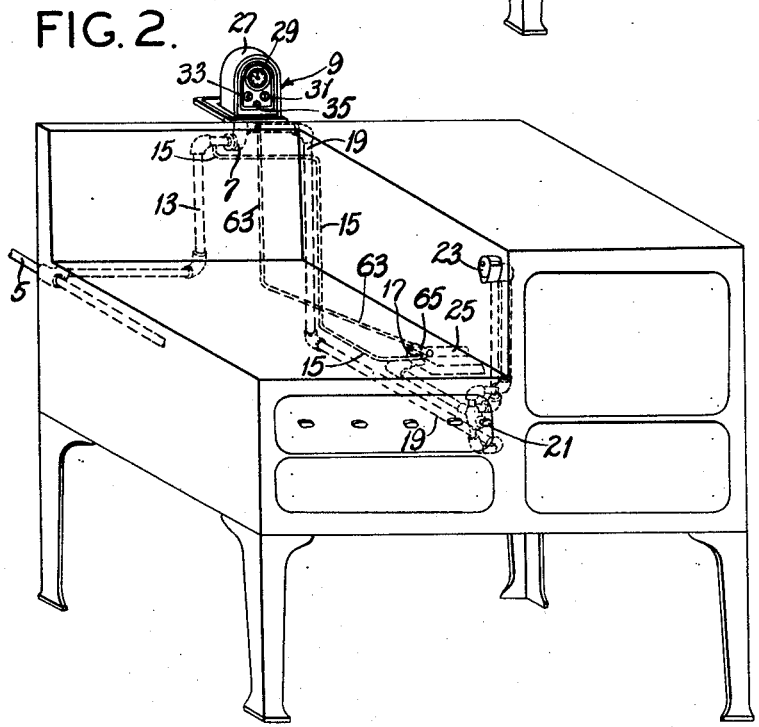
Fig. 2 is a view similar to Fig. 1, but showing the application of the control means in an alternative manner.

Fig. 2 illustrates an alternative use of the control means 9, such use being in connection more particularly with the oven part of the range. From the gas supply pipe 5 branches an oven supply pipe 13, which leads to the valve 7 of the control means 9. From the inlet side of the valve 7 a pipe 15 conducts gas to an oven pilot burner 17, so that flow of gas to said pilot burner 17 is steady and is not controlled by the opening and closing of valve 7. From the outlet side of the valve 7 a pipe 19 leads to the oven manual control valve 21, and thence to a suitable oven temperature control valve 23, and thence to the oven burner 25. The pilot burner 17 is in position to ignite gas flowing into the oven burner 25 from the pipe 19. In this embodiment, the control means 9 functions in such manner that if the pilot burner 17 is not ignited, flow of gas through the pipe 19 is prevented. The control means 9 also functions to control the flow of gas to the oven burner to a predetermined time interval in the future.

Figure 3:
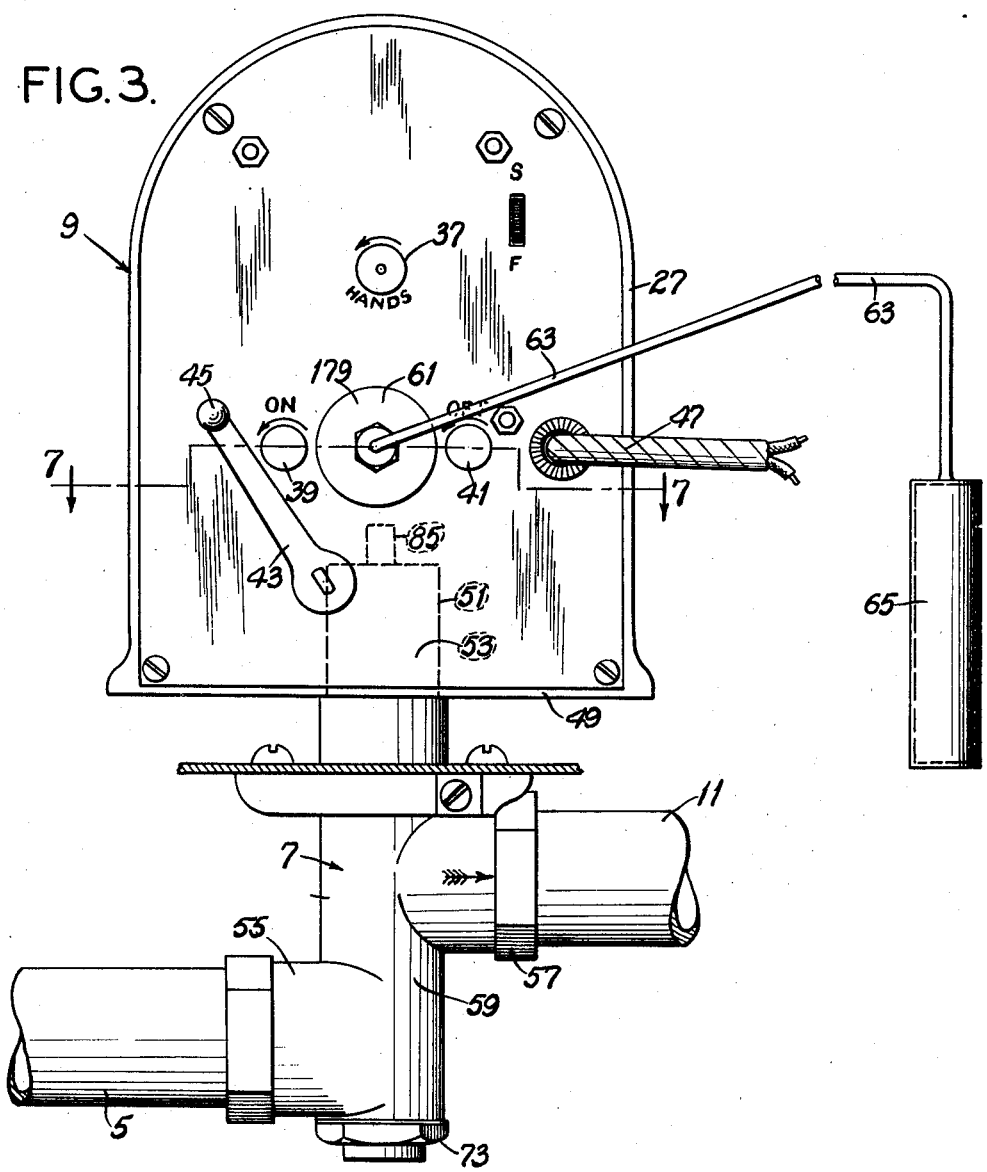
Fig. 3 is a back elevation of the control means shown in Figures 1 and 2.

Referring now more particularly to the control means 9, as illustrated in Figures 1 and 2 and the subsequent figures of the drawings, it will be seen to comprise a clock or like casing 27 on the front face of which appears a clock face 29 and a pair of set dials 31 and 33, as well as a condition indicating window 35. Viewed from the back, as in Fig. 3, the casing 27 is not dissimilar to the back of an ordinary alarm clock, having a hand-setting knob 37 as well as time on setting knob 39 and time off setting knob 41. A cocking lever 43 having a handle 45 is also provided. An electrical connection 47 is illustrated, although it is to be understood that the clockwork mechanism may be spring driven or electrically driven, as the case may be, without affecting the functioning of the present invention.

Numeral 49 indicates the bottom of the casing 27, said bottom 49 being provided with a central cylindrical recess 51 adapted to receive a cylindrical upper end 53 of the valve 7. The valve 7 comprises an inlet 55 and an outlet 57, together with a cylindrical body portion 59.

Extending from the back of the casing 27 is a bellows container or chamber 61, from which protrudes a capillary tube or the like 63 terminated by a bulb or capsule 65. The tube 63 is sufficiently long to position the bulb 65 at the pilot burner which it is desired to use for the controlling factor.

Figure 5:
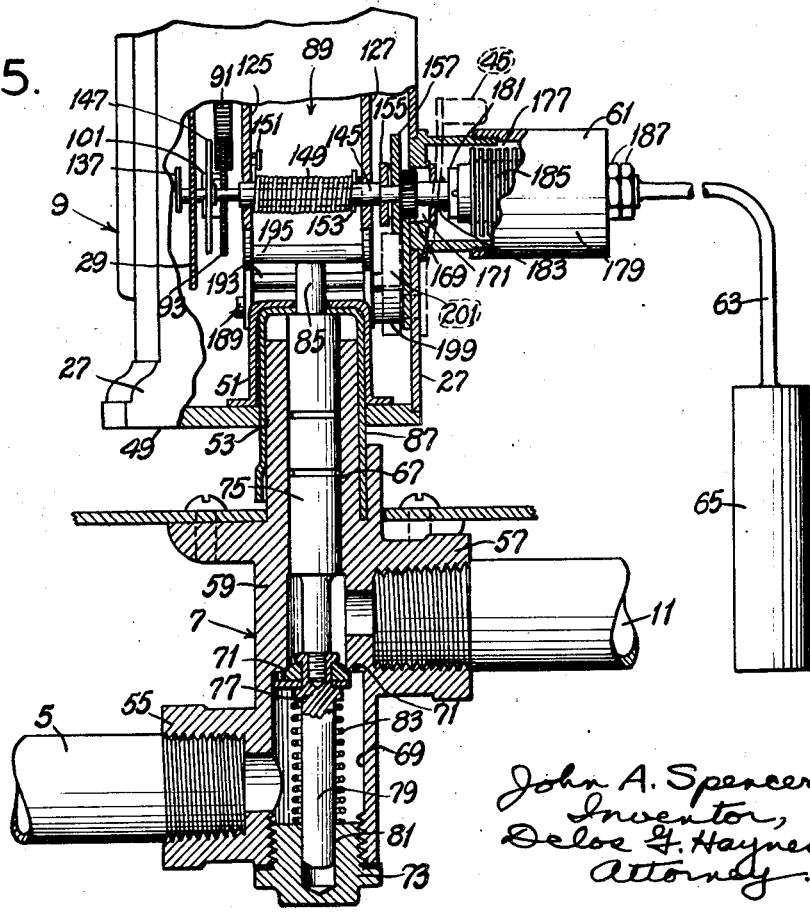
Fig. 5 is a vertical cross section taken on line 5—5 of Fig. 4, and including a valve.

The interior construction of the valve 7 is illustrated in Fig. 5. It will be seen to comprise a relatively long central bore 67 in a cylindrical portion 59, the bore 67 being counterbored as at numeral 69 at its lower end. The counterbore 69 provides an annular shoulder 71. A cap 73 closes the lower end of the cylindrical body portion 59. In the bore 67 slides a member 75, which includes near its lower end a valve closure 77 adapted to seat and unseat upon the annular shoulder 71. A continuation 79 of the body 75 slides in a central hole 81 in the cap 73, and is surrounded by a compression spring 83 which at all times urges the closure member 77 to seat upon the annular shoulder 71. From the top of the member 75 a portion 85 of reduced diameter extends upwardly through a cap or casing 87 provided on the upper end of the valve. It will be seen that by depressing the member 75, as by pressing upon the pin 85, against the spring 83, the valve closure member 77 is unseated from the shoulder 71 to permit flow of gas from the inlet 55 to the outlet 57; but when such pressure is removed from the pin 85 and the body 75 permitted to return to its normal position, the closure member 77 seats upon the shoulder 71 to shut the valve and prevent communication between the inlet 55 and the outlet 57.

Figure 4:
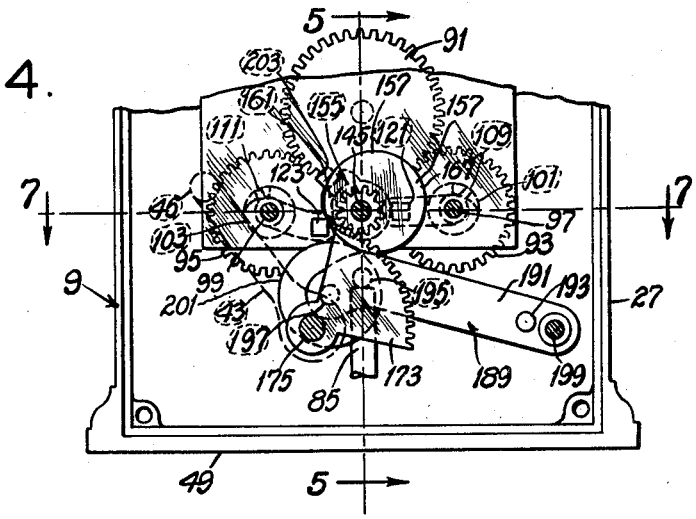
Fig. 4 is a vertical section of a portion of the control means.

The inner construction of the control means 9 per se is illustrated in greater detail in Figures 4, 5, etc. It will be seen that the control means comprises a clockwork or escapement mechanism 89, which, in the present embodiment, is electrically driven. The particular construction of the clockwork mechanism 89 is of no consequence to the present invention, it being sufficient to note that, for present purposes, its function is to drive a main gear 91 (Figures 4 and 5) in a regular, timed manner. A particular description of the clockwork mechanism 89 will therefore not be given herein.

The main gear 91, as driven by the clockwork mechanism, meshes with and drives a pair of gears 93 and 95, which are rotatably mounted upon shafts 97 and 99, respectively. The gears 93 and 95 have fixed thereto and upstanding therefrom cylindrical elements 101 and 103, the upper edges of which constitute cam surfaces. The cam elements 101 and 103 are identical and are disclosed in like angular positions with respect to the gears 93 and 95. The shafts 97 and 99 carry, non-rotatably with respect thereto, discs 105 and 107 provided with noses 109 and 111, respectively. The noses 109 and 111 engage the cam surfaces 101 and 103, respectively. Behind the gears 93 and 95 there are non-rotatably fixed to the shafts 97 and 99 a pair of arms 113 and 115, respectively, the arms 113 and 115 facing or pointing towards each other. Each arm 113, 115 is backed by a leaf spring 117, 119. At the outer ends of the arms 113, 115 are mounted bars 121, 123 of rectangular or square cross section, in a position generally parallel to that of the shafts 97 and 99.

The shafts 97 and 99, as well as the bars 121 and 123, are supported between a front plate 125 and a rear plate 127 forming part of the clockwork mechanism 89. Referring to Fig. 7, it will be seen that the shafts 97, 99 continue through the casing 27 to form supports for the knobs 39 and 41, respectively. Collars 129, 131 prevent longitudinal movement of the shafts 97, 99, while springs 133, 135 frictionally hold the shafts and their assemblies from too easy rotative motion. The shafts 97, 99 extend forwardly from the gears 93, 95 through the face plate of the casing 27 and are outwardly terminated by hands 137, 139 which cooperate with the time on and time off dials 31, 33.

Suitable slots 141, 143, through which the bars 121, 123 extend, together with the leaf springs 117, 119, permit a swinging or sideward motion of the bars 121, 123 in a manner to be described, within the limitation of the sizes of the slots 141, and 143, however.

Also supported between the plates 125 and 127, in a position midway between the shafts 97 and 99, is a central shaft 145 (Figures 5 and 7). On its front end, the shaft 145 carries an indicating dial 147. Surrounding the shaft 145 in the region between the plates 125 and 127 is a coil spring 149, one end of which is affixed to the plate 125 as indicated at numeral 151, and the other end of which is affixed to a pin 153 passing through the shaft 145. The coil spring 149 provides a counterclockwise (when considered as shown in Fig. 4) torque on the shaft 145 at all times. To the rear of plate 127 there is non-rotatably mounted on the shaft 145 a main cam 155 (see also Fig. 9), and behind the main cam 155 is a driving cam 157. The main cam 155 has a nose 161 thereon, one face 163 of which is flat and other face of which slopes gently from the normal circular periphery of the cam. The cam 157 is generally circular, but mounted off center on the shaft 145 to provide a lobe 167, the periphery of which is removed from the shaft 145 a greater distance than the periphery of the portion diametrically opposite.

Behind the cam 157, still on the shaft 145, is non-rotatably mounted a pinion 169. The pinion 169 is preferably rather thick, and extends into an opening or recess 171 provided therefor in the casing 27.

Meshing with the pinion 169 is a sector gear 173, which rotates on a shaft or pin 175 mounted on the casing 27. The shaft 175 extends through to the outside of the casing and has mounted on its outer side the lever 43 hereinbefore referred to. The arrangement of the lever 43, sector gear 173 and pinion 169 is such that by depressing the lever 43, a clockwise rotation is imparted to the pinion 169 and hence to the shaft 145, against the action of the spring 149.

Behind the pinion 169, the shaft 145 extends into the chamber 61. The chamber 61 comprises a cylindrical portion 177 which is welded or otherwise affixed to the casing 27, and which is threaded on its outer end to receive a cap 179. Within the chamber 61 so constituted, the shaft 145 terminates in a head 181. A compression spring 183 reacts at one end against the casing 27, and at the other end against the under side of the head 181, tending at all times to shift the shaft 145 on its axis towards the back of the mechanism (viewed as in Fig. 7).

Enclosed by the chamber 61 is an expansible bellows 185, the free end of which abuts the head 181. From the other, stationary end of the bellows 185 extends the capillary tube 63 hereinbefore referred to. Lock nuts 187 secure the bellows 185 immovably in position, except, of course, that the free end of said bellows is free to move against the head 181 as the bellows expands and contracts. The system comprising the bellows 185, capillary tube 63, and bulb 65 is gas-tight, and contains a certain amount of an expansible fluid, such as ether or the like.

Referring more particularly to Fig. 4, numeral 189 indicates a lever comprising side pieces 191 and cross pins 193, 195, and 197, which rotates on a pin 199 mounted in the casing 27. The pin 195 is in position to engage the projecting stem 85 of the valve 7, as illustrated in Fig. 5, and to depress said projection 85 when the lever 189 is moved downwardly from its Fig. 4 position. The pin 197 extends from the lever 191 and carries on its outer end a roller 201, which is positioned between the plate 127 and the back casing wall 27 (see Fig. 7). The roller 201, as illustrated more in detail in Fig. 9, rests upon and is engaged by the periphery of cam 157 under certain operating conditions to be described. The extent of rotation of the lever 189 is relatively so slight that no difficulty is experienced in keeping the pin 195 in engagement with the stem 85, as will be seen from the sequence of views comprising Figures 9, 10, and 11.

A projection 203 is permanently mounted on the plate 127 in position to form a stop for the cam 155, in a manner to be described.

The operation of the control is as follows:

If the fluid in the bellows system is cold, as will be occasioned in the recited example when the pilot burner is out, the bellows 185 is contracted and spring 183 reacting on the head 181 will withdraw shaft 145 to a limited extent from the casing 27. This withdrawing motion removes the cam 155 from such position that it can engage the ends of bars or latches 121 and 123. Accordingly, when the lever 43 is depressed in an endeavor to cock or set the device for further action, said lever 43 will not catch in its depressed position and no setting can be made, the lever 43 at once returning to its upper position under the action of the coil spring 149 driving the pinion 169. Under such conditions, therefore, it is impossible for the user to set the clockwork to open the valve 7, and this at once warns the user that the pilot burner is not ignited. When the pilot burner is ignited, the fluid in the bulb 65 expands and, transmitting its pressure through the capillary tube 63, causes the bellows 185 to expand against the head 181 and shift the position of shaft 145 inwardly into the casing, against the action of the spring 183. The shaft 145 in its thus-shifted position is illustrated in Fig. 8. The cam 155 is now in position to engage the ends of bars 121 and 123. It is to be noted that, regardless of the longitudinal position of the shaft 145, the cam 155 engages the permanent stop 203.

Setting of the device for future operation is accomplished by manual rotation of the knobs 39 and 41. The knob 39, it will be recalled, was indicated as the "Time on" knob, while the knob 41 was indicated as the "Time off" knob. By rotation of these knobs 39 and 41, the discs 105 and 107, and hence the projections 109 and 111 (Fig. 6) are brought into various angular positions with respect to the cams 101 and 103. If the setting has been such as to engage the projections 109, 111 with the flat upper face of the cams 101, 103, this action moves both gears 93 and 95 backwardly on the shafts 97, 99, it being remembered that the discs 105, 107 were fixed to the shafts 97, 99, while the gears 93, 95 were free to rotate relative to said shafts. This backward movement of the gears 93, 95 also longitudinally shifts the bars 121, 123, bringing their rearward ends into position to act as latches to intersect the path of the nose 161 of cam 155.

With the bars 121, 123 thus forced backwardly into intercepting position, the lever 43 may be manually depressed from the exterior of the device, the sector gear 173 then rotating pinion 169, and hence the cam 155, in a clockwise direction (Fig. 9). The elements then proceed from the Fig. 9 position to the Fig. 10 position. In passing from the Fig. 9 position to the Fig. 10 position, the projection 161 temporarily forces the ends of bars 121 and 123 aside by the engagement of sloping face 165 of said projection, the slots 141 and 143 permitting such sideward displacement of the ends of bars 121 and 123. In the final, completely cocked position, the projection 161 is caught or latched against the bar 123, this obstruction preventing the return of the cam 155 to its initial or Fig. 9 position under the rotating influence of the spring 149.

Nothing now happens until the time is reached for which the knob 39 has been set; in other words, the time at which it is desired to turn on the gas. By this time, the clockwork-controlled gear 91 (Fig. 6) has driven the gear 95 to rotate, carrying with it the cam 103, until the projection 111 is positioned on the sharp edge 112 of said cam 103. The longitudinal position of the gear 95, and hence the shaft 123, has not in the meantime shifted. However, during the next instant the projection 111 passes off the sharp edge 112 and the gear 95 is permitted to spring forward, carrying with it the bar 123, which thus moves forward withdrawing its latching end from the path of the projection 161 of cam 155. This permits the cam 155 to rotate instantaneously, under the influence of the spring 149, to the position shown in Fig. 11, at which time the projection 161 is stopped by engagement with the latching end of bar 121, which has not yet been removed from operative position. However, in rotating thus far, the cam 155 has carried with it in rotation the driving cam 157, and the lobe 167 being in engagement with the roller 201 of the lever 189, depresses said lever so that the pin 195 depresses the projection 85 to open the valve 7, permitting the flow of gas.

Gas flow is thus permitted until time is reached for automatically turning off the flow of gas, which has been predetermined by the initial setting of the knob 41. Engagement of the projection 109 with cam 101 (Fig. 6) ultimately causes the bar 121 to move outwardly and remove its latching end from position obstructing the cam 155, permitting said cam 155 to move from its Fig. 11 position back to its initial, Fig. 9 position. This rotation of cam 155 carries with it rotation of cam 157 and removes the lobe 167 from engagement with the roller 201, thus permitting the spring 83 of the valve 7 to force lever 189 upwardly again and close the valve 7.

Re recapitulate, the sequence of operations is as follows: The user of the device first sets the knobs 39 and 41 to the appropriate times at which it is desired to turn on and off the flow of gas. The user then depresses the lever 43. If the pilot burner is ignited, this depressing of the lever 43 results in cocking the device by movement of the cam 155 and its engagement with the latching ends of bars 121 and 123. This being the case, a definite time expires, upon the completion of which the cam 155 moves to open the valve. At the expiration of another interval of time, the cam 155 moves again to shut the valve, thus completing the cycle of operations. If, however, the pilot burner is not ignited, depressing of the lever 43 does not result in any cocking, for the cam 155 is not in position to engage the latching ends of bars 121 and 123, regardless of the operative position of said bars. Thus the user is warned that his pilot burner is not in operation, and that he must light it before he can set the time control feature of the stove to operate.

If, during a cycle, the pilot burner becomes extinguished, this moves the shaft 145 longitudinally regardless of the condition of the device and immediately permits the cam 155 to return to its initial, or Fig. 9 position, thus cutting off the flow of gas if it is on or moving into position to prevent ultimate turning on of the gas if it is off. Thus accidents incident to the extinguishment of the pilot burner are avoided.

The present invention is thus particularly applicable, it will be understood, when the pilot burner in the range is in an invisible position, as when it is inside the oven for lighting the oven burner.

This invention is broadly applicable to any gas appliances upon which automatic timing is desirable, such as ranges, stoves, water heaters, coffee urns, egg boilers, laundry equipment, space heating equipment, and the like.

The dial 147 may carry suitable indicia thereon to appear at the window 35 on the front of the device, and thus indicate the instantaneous condition of the control. Such legends, for example, may comprise the wording "Set" to correspond to the Fig. 10 position, the word "On" to correspond to the Fig. 11 position, and the word "Off" to correspond to the Fig. 9 position. These legends appearing at the window 35 further facilitate the ease with which the user may read the condition of his control.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A fluid flow control comprising a valve, a valve-actuating stem extending from said valve and operable, upon reciprocation thereof, to open and shut said valve, means engaging said stem for reciprocating the same, said means including a main shaft having an eccentric cam thereon, said main shaft having a plurality of angular positions determining through said eccentric cam the condition of said valve, a spring at all times urging said main shaft to return to a first of said angular positions determining a closed valve condition, manually actuatable means for rotating said main shaft against said spring progressively through a second of said angular positions determining an open valve condition, to a third of said angular positions again determining a closed valve condition, a stop-cam on said main shaft, latch bars positioned at said second and third positions with respect to said stop-cam, and time-controlled means operatively controlling the position of said latch bars, each of said latch bars being movable into position to intercept the rotation of said stop-cam, and thereby to hold said main shaft in its respective angular position against the action of said spring until the expiration of a predetermined time interval, and temperature-responsive means for shifting said main shaft longitudinally on its axis, whereby, under one set of external temperature conditions, said stop-cam is removed from intercepted position with respect to said latch bars regardless of their time-controlled position, and whereby said main shaft is automatically returned under the action of said spring to said first angular position, regardless of the condition of said time-controlled latch bars.

2. A control as set forth in claim 1, in which the temperature responsive means comprises a hermetically sealed system including a bulb positioned in the region the temperature of which it is desired to make the control responsive to, a bellows, and a tube connecting said bulb and bellows, said system being filled with a gas expansible under advancing temperature conditions to extend the bellows, and means holding the bellows in proximity to the end of the main shaft, whereby movement of the bellows effects said longitudinal shifting of the main shaft.

3. A control as set forth in claim 1, in which the temperature responsive means comprises a hermetically sealed system including a bulb positioned in the region the temperature of which it is desired to make the control responsive to, a bellows, and a tube connecting said bulb and bellows, said system being filled with a gas expansible under advancing temperature conditions to extend the bellows, means holding the bellows in proximity to the end of the main shaft, whereby movement of the bellows effects said longitudinal shifting of the main shaft, and spring means normally pressing the main shaft longitudinally in a direction opposite to the direction imparted to said main shaft by said expanding bellows.

4. A control as set forth in claim 1, in which said time-controlled means include means for separately, adjustably predetermining the length of the time interval during which each of said latch bars will remain in position to intercept the rotation of said stop-cam.

5. A control as set forth in claim 1 in which the time-controlled means comprises a single clockwork mechanism operating both of said latch bars, and means for separately, adjustably predetermining the length of the time interval, under control of said clockwork mechanism, during which each of said latch bars will remain in position to intercept the rotation of said stop-cam.

6. A control as set forth in claim 1, in which each of the latch bars is provided with a resilient mounting permitting it to spring aside to pass said stop-cam when the same is being manually rotated in a direction against its spring.

7. A control as set forth in claim 1, in which the manually actuatable means comprises a shaft, a lever secured to said shaft, a sector gear attached to said shaft, and a pinion on said main shaft meshing with said sector gear.

8. A fluid flow control comprising a valve, a valve-actuating stem extending from said valve and operable, upon reciprocation thereof, to open and shut said valve, means engaging said stem for reciprocating the same, said means including a main shaft having an eccentric cam thereon, said main shaft having two positions longitudinally of its axis, and means for shifting said main shaft between said two longitudinal positions in response to external temperature variations, said stem-engaging means being operable in both of said longitudinal positions, said main shaft having three angular positions, in a first of which said eccentric cam is positioned to maintain said valve in closed position, in the second of which said eccentric cam is positioned to maintain said valve in open position, and in the third of which said eccentric cam is positioned to maintain said valve in closed position, means tending at all times to return said main shaft to its said first angular position, and manual means for moving said main shaft from its said first to its said third angular position, time-controlled means, and means operatively interconnecting said time-controlled means and said main shaft in such manner that said time-controlled means is effective to delay the return of said main shaft from its said third to its said second angular position, and from its said second to its said first angular position, said interconnecting means, however, operatively connecting said time-controlled means and said main shaft only when said main shaft is in one its two said longitudinal positions.

9. A control as set forth in claim 8, in which the temperature responsive means comprises a hermetically sealed system including a bulb positioned in the region the temperature of which it is desired to make the control responsive to, a bellows, and a tube connecting said bulb and bellows, said system being filled with a gas expansible under advancing temperature conditions to extend the bellows, and means holding the bellows in proximity to the end of the main shaft, whereby movement of the bellows effects said longitudinal shifting of the main shaft.

10. A control as set forth in claim 8, in which the temperature responsive means comprises a hermetically sealed system including a bulb positioned in the region the temperature of which it is desired to make the control responsive to, a bellows, and a tube connecting said bulb and bellows, said system being filled with a gas expansible under advancing temperature conditions to extend the bellows, means holding the bellows in proximity to the end of the main shaft, whereby movement of the bellows effects said longitudinal shifting of the main shaft, and spring means normally pressing the main shaft longitudinally in a direction opposite to the direction imparted to said main shaft by said expanding bellows.

JOHN A. SPENCER.